United States Patent
Carton et al.

[15] 3,666,288
[45] May 30, 1972

[54] SELF-ADAPTING SPRING SUSPENSION SYSTEM FOR VEHICLES

[72] Inventors: John E. Carton, 2083 Carton Way; George A. Mertz, 1851 Carton Way, both of Grants Pass, Oreg. 97526

[22] Filed: Sept. 9, 1970

[21] Appl. No.: 70,703

[52] U.S. Cl. ..........................................280/124 F, 267/15 A
[51] Int. Cl. ..........................................................B60g 11/26
[58] Field of Search ...................267/11 A, 15 R, 15 A, 65 R, 267/65 D; 280/124 F

[56] References Cited

UNITED STATES PATENTS 3,618,972  11/1971  Buhl......................................267/11 A
2,976,031  3/1961   Takagi...................................267/15 A
2,916,296  12/1959  Muller...................................267/15 A

*Primary Examiner*—Philip Goodman
*Attorney*—Clarence M. Crews

[57] ABSTRACT

An automatically self-adapting spring suspension system is provided for road vehicles in which the springs are automatically readjusted to increase their stiffness in response to increase of load, and in response to any shock of such unusual severity that the wheels are caused to pass a predetermined point during relative approach of the wheels and chassis. Illustratively pneumatic springs are stiffened by the automatic addition of air under pressure. Provision is made for conveniently bleeding the air simultaneously and equally from the springs when a change of load, or of roughness of the road requires a reduction of spring stiffness.

10 Claims, 5 Drawing Figures

PATENTED MAY 30 1972   3,666,288

INVENTORS:
JOHN E. CARTON
GEORGE A. MERTZ
by: Clarence M. Crews
their attorney

SELF-ADAPTING SPRING SUSPENSION SYSTEM FOR VEHICLES

This invention relates to vehicle spring suspension systems which are, in part at least, of the pneumatic type. While the invention is not limited to suspension systems of the platform type, or of the cantilever type, or to systems designed specifically for trailers, it is illustratively disclosed herein as embodied in a platform, cantilever type system, as applied to a trailer.

The primary purpose of the invention is to provide a suspension system which is automatically adaptable to the load carried, and also to the severity of road conditions, the spring system being stiffened or reinforced by increase of load and also by shocks of usual severity.

It is a further purpose to provide for ready and convenient, measured reduction of spring stiffness when travel on an unusually rough stretch of road has been concluded, or when the load has been materially reduced.

In the simplest form of the invention, chosen for illustration, a trailer, adapted to be supported at its forward end by a towing vehicle includes a compressed air reservoir capable of being charged with compressed air by any suitable means, say at a service station, together with pnuematic spring means at opposite sides of the trailer, and with means for simultaneously and equally delivering compressed air automatically from the reservoir to said spring means to stiffen the resistance of the latter, as the load on the trailer is increased, and each time a sufficiently unusual bump is encountered to cause relative approach of the wheels and the sprung parts beyond a predetermined limit.

While a single pneumatic spring is shown herein at each side of the vehicle, these springs may be of increased or reduced size as desired, or they may be multiplied in number at each side of the vehicle, or supplemented by any conventional springs of fixed characteristics to meet the requirements of the service to which the vehicle is to be put. The replenishment of the reservoir for maintaining reservoir pressure within prescribed limits may also be automatically effected and controlled by mechanism which includes a vehicle carried, mechanically or electrically operated compressor.

It is a further feature that the pneumatic springs also include in their structure means serving the desirable function of pneumatic shock absorbers.

Other objects and advantages will hereinafter appear.

In the drawing forming part of this specification,

Figure 1:
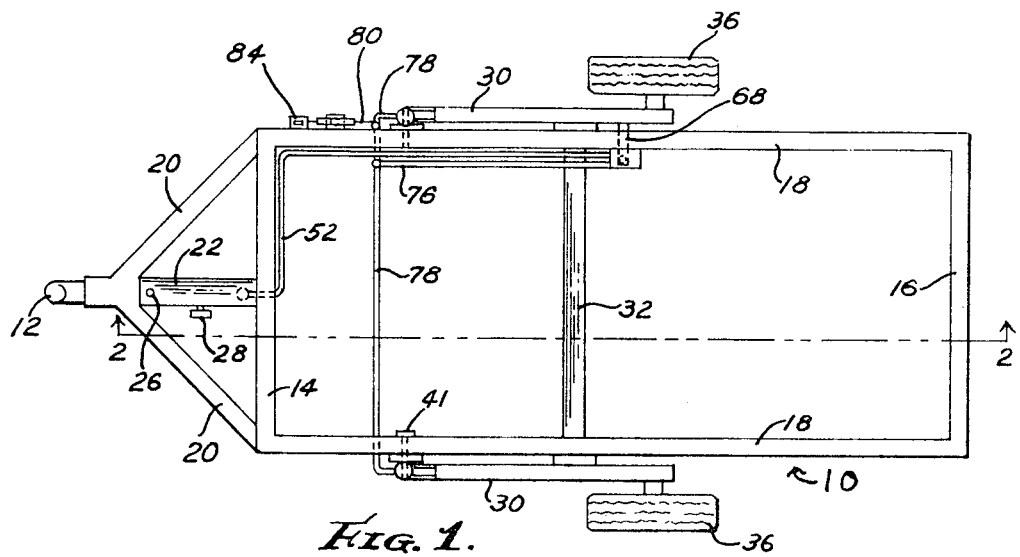
FIG. 1 is a small scale plan view of the frame or chassis, the wheels and the spring suspension of a practical and advantageous form of trailer which embodies features of the invention.
Figure 2:
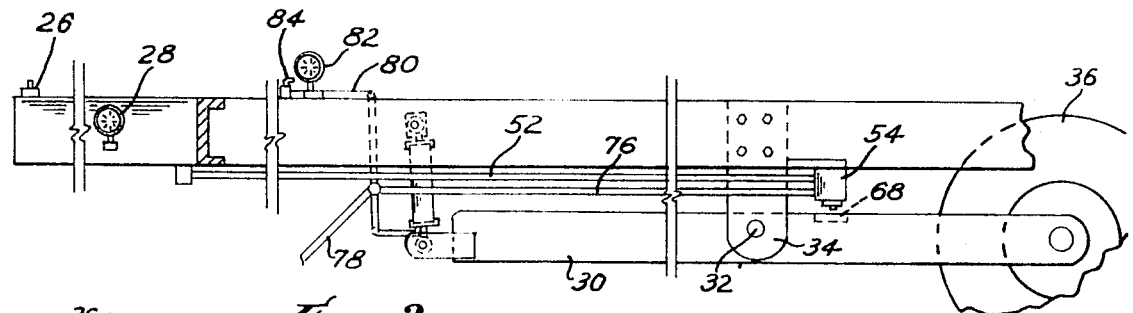
FIG. 2 is a fragmentary view in sectional elevation of the structure shown in FIG. 1, the view being taken on the line 2—2 of FIG. 1, being on a larger scale than FIG. 1, and being broken away in several places intermediate its ends for compactness of illustration.

In the form of the invention illustrated in FIGS. 1 to 4, a vehicle frame 10, specifically a trailer frame, comprises a conventional towing hitch 12, transverse front and rear members 14 and 16, and longitudinal side members 18. The hitch is connected to the forward transverse member 14 through obliquely extending members 20 and a hollow cylindrical brace member 22. The structure thus far described may be in all respects conventional, save that the hollow cylindrical brace member 22 is especially constructed to serve also as a compressed air reservoir for confining air under high pressure and for supplying compressed air to stiffen the action of pneumatic springs 24 as required. The reservoir is equipped with a check valve 26, like a conventional tire valve, which admits air so long as an air supply hose is applied to it, and automatically closes when the hose is withdrawn. In other words, the reservoir may be charged with air at a service station or through an applied pump in the same way and by the same means through which a tire is normally inflated, but to a much higher pressure. A pressure gauge 28, in constant communication with the interior of the reservoir reveals the pressure of the air contained in the reservoir and serves as an indicator of the need for reservoir replenishment, and of the point at which replenishment should be discontinued. As previously noted, pumping means and automatic control means may be provided on the trailer or on the towing vehicle.

The spring suspension system shown is of the cantilever type and of the platform type, and the springs are not only pneumatic springs, but they combine pneumatic shock absorbers in their structure. The spring suspension means at opposite sides of the vehicle are desirably identical.

Identical levers 30 are affixed intermediate their ends upon opposite ends of a transverse, normally horizontal axle 32 which is rotatably mounted in hangers 34. The hangers 34 are rigidly affixed to the respective frame members 18. Each lever 30, at its rear end, rotatively carries a wheel 36.

Each lever 30, at its forward end, is pivotally connected to the lower end of a piston rod 38. Each piston rod 38 has fast on its upper end a piston 40 which fits slidingly, in a substantially air-tight manner, in a cylinder 42. The upper end of the cylinder is connected for fore and aft rocking motion, through a pivot pin 41, with associated side member 18 of the chassis.

The lower end of the cylinder is sealed against the escape of air where the piston rod 38 passes through it. The air in the lower chamber 43 of the cylinder is maintained under high pressure and constitutes the elastic medium for permitting play of the associated wheel relative to the frame and for cushioning the frame against road shocks.

The portion of the cylinder above the piston is divided by a partition wall 45 between an intermediate chamber 44 and an upper chamber 46 for shock absorbing purposes. The partition wall 45 is formed with an opening 48 of substantial size which is normally covered and lightly closed by a check valve 50, shown as a flap valve.

When either wheel encounters a bump, both wheels are forced upward in unison, both pistons 40 are pulled downward in unison, and air in the chambers 43 is compressed beyond its normal pressure. The chambers 44 are enlarged, reducing the air pressure in them. The flap valves 50 are thereby caused to open and air pours freely from the chambers 46 through the large openings 48 into the chambers 44. In due time downward movement of the pistons 40 is arrested by the increased pressure of air in the chambers 43, and this air forces the pistons up, compressing the air in chamber 44. This closes the flap valves so that the large openings 48 are not available for the return of air from 44 to 46. The return of air is restricted to small passages 52 in the respective partitions 45, so that the recoil is greatly retarded, and the well understood shock absorber action is realized.

Figure 4:
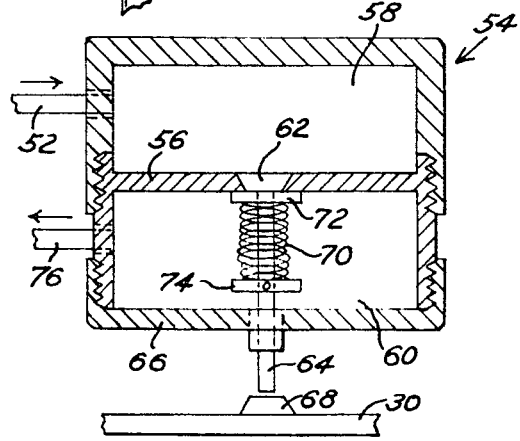
FIG. 4 is a fragmentary view in sectional elevation of a valve and operating means therefor, through which the feeding of air to the pneumatic springs is automatically controlled.
Figure 3:
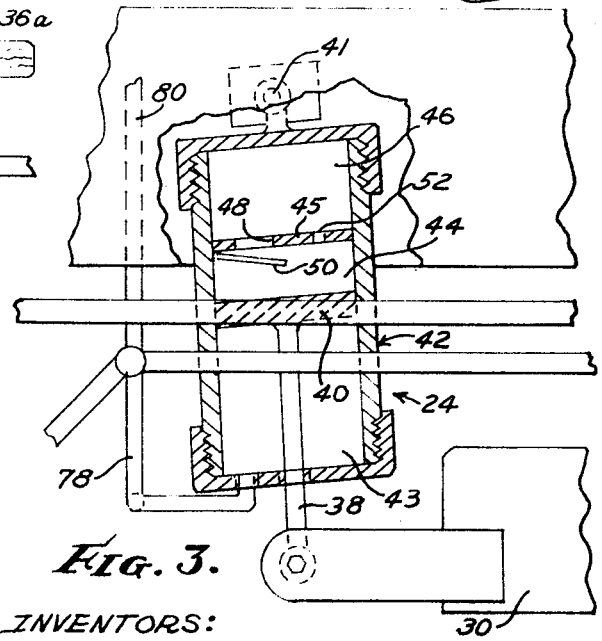
FIG. 3 is a fragmentary view in sectional elevation showing a combined pneumatic spring and shock absorber, and parts immediately associated therewith.

The means for increasing the amount of air in the lower chambers 43 of the cylinders 42 comprises a hose 52 which runs to a control box 54 (FIG. 4). The box 54 includes a partition 56 which divides the box into intake and discharge chambers 58 and 60. A valve 62 normally closes a passage through the plate 56. The valve has a stem 64 which passes downward through the lower wall 66 of the box and has a lower exposed end which normally stands clear of a side arm 68 of one of the arms 30, but which is engaged and actuated by the arm 68 when an unusual bump occurs, or when the vehicle is loaded heavily enough to bring about engagement of the arm 68 with the stem 64.

A spring 70 surrounds the stem 64 within the chamber 60, bearing at its upper end, through a washer 72 against the partition 56, and at its lower end against a collar 74 which is fast on the stem. The spring normally holds the valve yieldingly but firmly in closed position, but the valve is opened for passing air from chamber 58 to chamber 60 any time that the stem 64 is thrust upward by arm 68.

The chamber 60 transmits the admitted air through a hose 76 and thence through branch hoses 78 to the lower chambers 43 of the cylinders 42.

When the vehicle has been running on very rough road, or when the load is radically reduced, it may be desirable to soften the spring action by bleeding off some of the air in the cylinder chambers 43. For this purpose a bleeder hose 80, in constant communication with the hoses 76 and 78, and in communication with a pressure gauge 82, is provided with a manually operable, but normally closed exhaust valve 84. The pressure gauge is of some help in guiding the operator in the bleeding operation, but the relative positions of the arm 68 and the valve stem 64, which are at the same side of the vehicle as the valve 84, have more dependable, controlling significance.

The fact should be noted that any depletion of air in the pneumatic springs, caused by leakage, is automatically made up by the air supply means described.

While the levers 30 have been shown and described as levers of the first class (each with the wheels and the pneumatic spring connected at opposite sides of the fulcrum in opposed relation), the arrangement may be varied by placing the wheels and the springs at the same side of the fulcrum, so long as the springs are arranged to resist relative approach of the wheels and the chassis.

Figure 5:
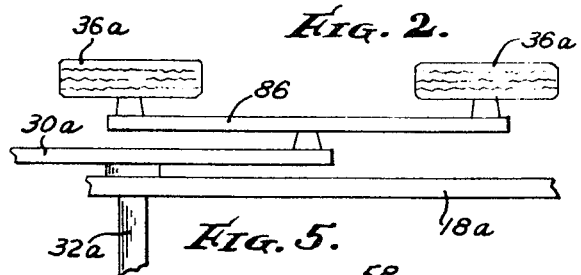
FIG. 5 is a fragmentary plan view of a modified form of running gear in which two wheels balanced against one another, are provided on the levers at each side of the vehicle.

The structure of FIG. 5 is generally the same as that of FIGS. 1 to 4, and accordingly corresponding reference characters have been applied to corresponding parts with the postscript *a* added in each instance. Each lever 30*a*, however, instead of directly carrying a wheel, pivotally supports a supplemental lever 86 midway of the length of the latter, and the lever 86, in turn, carries road engaging wheels 36a at its opposite ends.

We have disclosed what we believe to be the best embodiments of our invention.

We claim:

1. A road vehicle having, in combination,
   a. a chassis,
   b. levers mounted at opposite sides of the chassis upon a common transverse axis,
   c. road bearing wheels carried by the levers at corresponding portions thereof,
   d. correspondingly located pneumatic springs interposed between the levers and the chassis, constructed and arranged resiliently to oppose relative approach of the wheels and the chassis, and each including a compressed air chamber of variable capacity, and
   e. means maintaining said chambers under substantially equal pressures, comprising
      e1. supply means for providing air under pressure,
      e2. means connecting said supply means with said chambers and constantly connecting the chambers in communication with one another,
      e3. valve means forming part of said connecting means for controlling the transmission of air to said chambers, and
      e4. valve actuating means carried by at least one of said levers and constructed and arranged to effect delivery of air to said chambers for effecting readjustment of air pressure to increase the stiffness of the spring action equally at both sides of the vehicle whenever the wheel carried by such lever passes a prescribed point in moving toward the chassis.

2. A road vehicle as set forth in claim 1 in which a common transverse rotary axle is provided on the chassis for the levers, and the levers are fixed in parallel relation upon the opposite ends of said axle.

3. A road vehicle as set forth in claim 1 in which the air supply connecting means further includes a conveniently accessible, manually operable air bleeding means common to the compressed air chambers.

4. A road vehicle as set forth in claim 3 which further includes a pressure gauge, associated with the air bleeding means, and connected to indicate the air pressure in the chambers.

5. A road vehicle as set forth in claim 3 in which the air bleeding means and the valve actuating means are at the same side of the vehicle.

6. A road vehicle as set forth in claim 1 in which the vehicle is a trailer having a hitch and the air supply means is a cylindrical reservoir which also forms a reinforcing connection between the hitch and the chassis.

7. A road vehicle as set forth in claim 6 in which the air supply means is equipped with an intake check valve in the form of a conventional tire valve, adapting the reservoir to be charged with air at a service station.

8. A road vehicle as set forth in claim 1 in which each pneumatic spring is formed by a cylinder member and a piston member, with one of said members connected to the chassis and the other to the associated lever, and with the compressed air chamber of variable capacity formed between the piston and one end of the cylinder.

9. A road vehicle as set forth in claim 8 in which a pneumatic shock absorber is provided in the end of each cylinder opposite to the compressed air chamber, each such shock absorber including a fixed partition in the cylinder which divides the cylinder space in which it is located into an intermediate chamber and an extreme chamber, said partition having a comparatively large opening through which air may flow freely from the extreme chamber to the intermediate chamber as the wheels approach the chassis, a check valve automatically preventing flow of air through said opening from the intermediate chamber to the extreme chamber during rebound, the partition also having a constantly open, comparatively small opening, through which air may leak back from the intermediate chamber to the extreme chamber.

10. A vehicle as set forth in claim 1 in which each of the levers carries two road bearing wheels, the construction and arrangement being such that each of said levers carries a secondary lever of the first class, and each of said secondary levers carries a road bearing wheel at each of its opposite ends.

* * * * *